United States Patent [19]
Kendall

[11] 3,756,190
[45] Sept. 4, 1973

[54] PRESSURE RESPONSIVE DEVICE FOR INDICATING THE MAGNITUDE OF PRESSURE CHANGES

[76] Inventor: Harland R. Kendall, 1313 Chatham Dr., Visalia, Calif. 93277

[22] Filed: Feb. 18, 1972

[21] Appl. No.: 227,537

[52] U.S. Cl. ............................ 116/34 R, 73/146.3
[51] Int. Cl. ............................................ B60c 23/04
[58] Field of Search .................. 73/146.3, 146.8, 73/388 R, 410, 418, 411, 409; 92/92; 116/34 R

[56] References Cited
UNITED STATES PATENTS 3,561,330  2/1971  Rich ................................... 73/410
3,680,523  8/1972  Gaskins ............................ 73/146.8

*Primary Examiner*—Donald O. Woodiel
*Attorney*—Herbert A. Huebner et al.

[57] ABSTRACT

A pressure responsive device for indicating the magnitude of pressure changes as they occur in a confined body of fluid. The device is characterized by a flexible tubular member communicating with the body of fluid having a wall portion thereof supported against elongation whereby the tubular member is caused to assume an arcuate configuration as the magnitude of the pressure increases, and a substantially linear configuration as the magnitude of the pressure of the body of fluid decreases. The device has particular utility with truck tires and the like for alerting drivers of reduced tire pressures.

7 Claims, 7 Drawing Figures

PATENTED SEP 4 1973 3,756,190
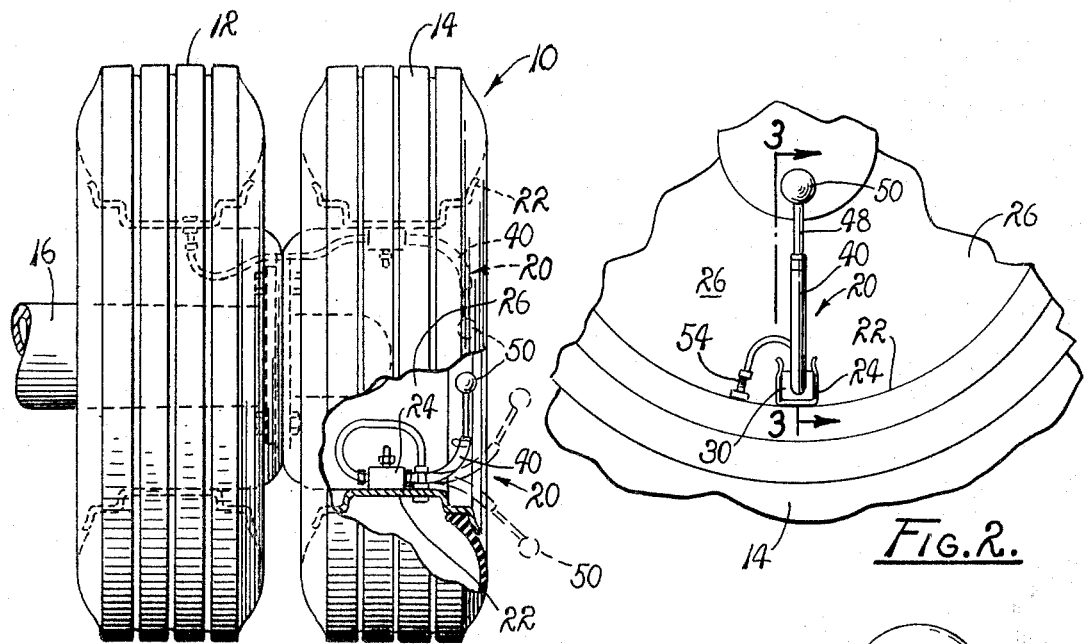
Fig. 1.
Fig. 2.
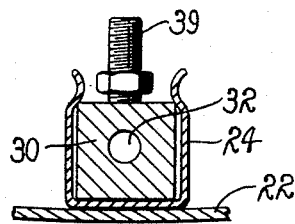
Fig. 4.
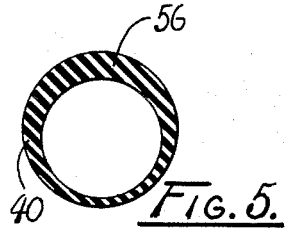
Fig. 5.
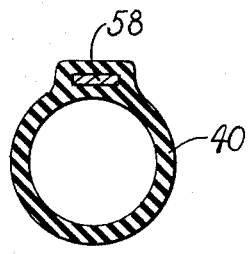
Fig. 6.
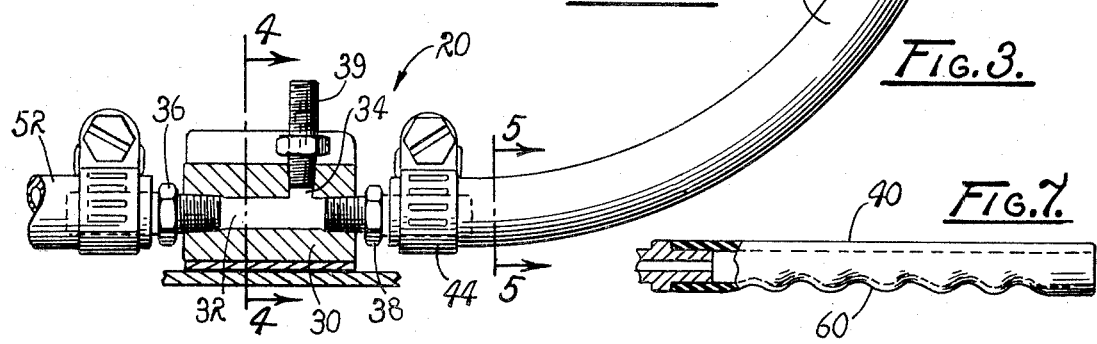
Fig. 3.
Fig. 7.

PRESSURE RESPONSIVE DEVICE FOR INDICATING THE MAGNITUDE OF PRESSURE CHANGES

BACKGROUND OF THE INVENTION

The invention relates to pressure responsive devices and more particularly to a pressure responsive device for indicating the magnitude of changes in pressure experienced in a body of fluid confined within the tire of an operating vehicle.

As is appreciated by those familiar with the operation of dual-wheel vehicles, such as those frequently employed on highways in "trucking" commerce, it is quite difficult to detect low pressure conditions as they occur in the tires of operating vehicles. The problem becomes particularly bothersome where one tire of a pair of tires mounted on a dual wheel experiences a loss of pressure. This problem becomes acute in instances where the loss in pressure is experienced in the inboard tire since the visual examination of the tire frequently is impeded. It has been postulated that "low tires" account for from 10 to 15 percent of vehicle operation costs. Furthermore, it is not uncommon for fires to develop as a direct consequence of under-inflated tires.

In order to avoid undesired consequences of under-inflated tires, many operators periodically halt their vehicles, dismount and examine each tire in turn. While this technique is, in many instances, successfully employed in reducing operating costs, it is recognized that the vehicle operators often employ their vehicles under conditions which severely discourage any use of the technique.

In an effort to solve this perplexing problem, a use of various devices has been suggested. Such are typified by the device shown in United States Letters Patent No. 3,527,189 which issued to Mark J. Perry, Sept. 8, 1970.

Of course, as is well recognized with those familiar with the trucking industry, any device employed on the wheels of vehicles and the like must, in order to function efficiently, be of a simple design, including minimal mechanical components, be easily maintenanced, and be substantially resistant to the effects of ice, water, snow, mud and the like.

Therefore, any device which is successfully employed on the wheels of operating vehicles, for indicating losses in tire pressures, as they occur, must be simple, easy to maintain, economic, and efficient in its operation.

OBJECTS AND SUMMARY OF THE INVENTION

It is therefore an object of the instant invention to provide an improved pressure responsive device.

It is another object to provide an improved pressure responsive device for indicating the magnitude of pressure changes as they occur in a confined body of fluid.

It is another object to provide a pressure responsive device for indicating the magnitude of pressure changes as they occur in the tires mounted on the wheels of operating vehicles.

It is another object to provide an improved pressure responsive device for use with the wheel of an operating vehicle, including a flexible tubular member, communicating with the fulid of a tire mounted on the wheel, responsive to changes in the pressure of the fluid for causing the tubular member to assume a retracted arcuate configuration as the magnitude of pressure is increased above a predetermined level, and a substantially linear configuration as the magnitude of the pressure is decreased below a predetermined level.

These and other objects and advantages are achieved through the use of a flexible tubular member communicating with the fluid of the tire mounted on the wheel of a vehicle responsive to changes in pressure of the fluid for assuming an inwardly directed arcuate configuration as the magnitude of the pressure increases and in extended linear configuration as the magnitude of the pressure decreases.

BRIEF DESCRIPTION OF THE DRAWINGS

FIG. 1 is a partially sectioned elevation of a dual wheel equipped with a pair of pressure responsive devices, each of which includes a flexible tubular member communicating with the fluid confined within the tires mounted on the wheel.

FIG. 2 is a fragmented side view of one of the devices shown in FIG. 1.

FIG. 3 is a partially sectioned view, on an enlarged scale, taken generally along line 3—3 of FIG. 2.

FIG. 4 is a cross-sectional view taken generally along line 4—4 of FIG. 3.

FIG. 5 is a cross-sectional view of one form of the tubular member.

FIG. 6 is a cross-sectional view of another form of the tubular member.

FIG. 7 is a side elevation of still another form of the tubular member employed by the device of the instant invention.

DESCRIPTION OF THE PREFERRED EMBODIMENT

Referring now to the drawings wherein like reference characters designate like or corresponding parts throughout the several views, there is shown in FIG. 1 an elevational view of a dual wheel, generally designated 10, having mounted thereon a first and a second pneumatic tire, 12 and 14, respectively.

The dual wheel 10 is conveniently supported on an axle, designated 16 of a vehicle, such as frequently is provided for buses, trucks, and similar machines not shown. The particular manner in which the wheel 10 is mounted on the axle 16 is a matter of convenience only and forms no specific part of the instant invention. Therefore, a detailed description of the dual wheel 10 and its mounting is omitted in the interest of brevity.

The dual wheel 10 is provided with a pair of pressure responsive devices, each being generally designated 20. Since the devices 20 are of a similar design and function in a similar manner for similar purposes, a detailed description of a single device is deemed sufficient to provide a complete understanding of the invention.

As shown, each of the devices 20 is affixed to the outermost rim, designated 22, of the dual wheel 10. As a practical matter, the device is supported within a suitable bracket 24 securely fixed to the rim 22, within the cavity 26 of the wheel 10. Of course, it should be appreciated that the bracket 24 is fixed to the rim 22 by any suitable means, including rivets, spot-welds and the like. Since the particular manner in which the bracket 24 is affixed to the rim 22 is deemed to be a matter of conveniece, a detailed description is omitted. In any event, it is to be understood that the bracket 24 is secured to the rim 22 within the cavity 26 and accommodates a releasable coupling of the device 20 to the rim 22.

The pressure responsive device 20 includes a base block 30 seated within the bracket 24 and having a bore 32 extended therethrough. Communicating with the bore 32 is an angularly related bore 34. The bore 32 extends along an axis generally paralleling the axis of symmetry of the axle 16 while the bore 34 is extended radially with respect thereto. Within the inboard end of the bore 32 there is threaded a pneumatic fitting 36, while a similar pneumatic fitting 38 is threadingly received within the outboard end of the bore 32. Within the bore 34 there is seated a pneumatic fitting 39 consisting of a valve stem having a valve core, not designated. The fitting 36 can, in practice, be considered an inlet fitting for the block 30 while the fitting 38 functions as a coupling for a flexible tubular body 40. This body 40 has affixed to its outermost end a flag 42 so that the body, in effect, assumes the characteristics of a flexible staff for the flag.

The body 40 is secured to the fitting 38 by a suitable hose-clamp 44 while the flag 42 is united with the tubular body 40 by means of a hose-clamp 46 which binds the body 40 to a supporting stem 48. It will, of course, be appreciated that the particular manner in which the body 40 is mounted on the fitting 38 and/or coupled with the flag 42 is a matter of convenience and can be varied as desired. In practice, the flag 42 includes, at the distal end of the stem 48, a spherical mass 50. Preferably, the mass 50 is formed of any suitable material and is of a readily perceptible color for attracting the attention of an operator of a vehicle equipped with the dual wheel 10. Furthermore, the mass 50 is of a selected weight, which develops forces of a determinable magnitude when angular acceleration is imparted to the wheel 10.

In order to couple the base block 30 with a given one of the tires, a conduit 52, preferably of flexible material, is mounted on the fitting 36 in a manner quite similar to that in which the body 40 is mounted on the fitting 38. The opposite end of the conduit 52 is secured to a valve stem, designated 54, provided for one of the tires for filling the tire and gauging the pressure developed within the associated one of the tires. As a practical matter, the valve core of the stem 54 can be removed, if so desired, from the valve stem whereby the tubular body 40 communicates directly with the pneumatic pressure confined within the tire from which the conduit 52 is extended.

The body 40, in operation, responds to pressure exceeding a predetermined magnitude established within the tire to which the conduit 52 is affixed and curls into an arcuate configuration extending radially toward the axle 16 and, in the presence of pressure beneath that magnitude, extends laterally from the cavity 26 of the wheel 10. Since the spherical mass 50 is subject to the effects of centrifugal forces acting thereon as the wheel 10 is rotated, there is a distinct tendency for the spherical mass 50 to be forced outwardly from the wheel 10. Therefore, in order for the body 40 to retain an arcuate configuration, the pressure within the associated tire must be of a magnitude such that the body is capable of withstanding the effects of the centrifugal forces applied to the mass 50.

The arcuate configuration operatively assumed by the body 40 is facilitated by its construction, which may take any one of several forms. As shown in FIG. 5, the body 40 is formed of a flexible, resilient material, such as rubber, extruded or otherwise formed into a tubular member having a thickened wall portion 56 extending longitudinally along the wall of the body 40 nearest the axle 16. Thus the wall portion 56 tends to more readily withstand deformation than the wall portion diametrically opposite thereto. Therefore, as pressure is increased within the body 40, the wall portion of the body opposite the thickened wall portion 56 is elongated causing the body 40 to assume a desired arcuate configuration, illustrated in FIG. 3, whereby the mass 50 is positioned within the cavity 26 adjacent to the axle 16. Once the pneumatic pressure within the body 40 is sufficiently depleted, the resiliency of the material from which the body is formed tends to return the body 40 to a linear configuration. This action, of course, is accelerated in instances where centrifugal forces are simultaneously applied to the mass 50.

Where preferred, the body 40 is provided with an elongated, linear leaf spring 58 extended longitudinally along the wall of the body 40 nearest the axle 16. As illustrated in FIG. 6, the spring 58 can be embedded in the wall of the body employing any suitable technique, such as vulcanizing and the like. The function of the leaf spring 58 is to preclude elongation of the adjacent portion of the wall of the body 40 as pressurization within the body occurs and the portion of the wall opposite the leaf spring responsively elongates. Thus, a body 40 also provided with the spring 58 is caused to assume the arcuate configuration, illustrated in FIG. 3. This body is returned to the substantially linear configuration as pressure in the body is depleted and the forces of recovery within the material from which the body is formed and the leaf spring causes the elongated wall portion to contract and the spring to assume its original linear configuration.

As a practical matter, a device 20 having a tubular body 40 provided with truncated annular corrugations or bellow-like pleats formed along a wall portion 60 can be employed quite satisfactorily. When the body 40 is pleated, in the manner illustrated in FIG. 7, the wall portion 60 is permitted to elongate for deforming the body 40. Of course, the wall portion 60 cannot be relied upon to return the body 40 to its original, elongated configuration. Hence, the wall portion of the body 40 opposite the pleated wall portion 60, acting in conjunction with applied centrifugal forces, serves to apply the required forces of recovery for returning the body 40 to its elongated configuration.

Consequently, where the device 20 employs a tubular body 40 having a pleated wall, it is often preferred to utilize a thickened wall portion 56 or, alternatively, a leaf spring 58 in order to assure a recovery of the body 40 into a substantially linear configuration, once pneumatic pressure within the associated tire is depleted, for positioning the mass 50 outwardly from the cavity 26. It will, of course, be understood that matters such as the pneumatic pressure developed within the body 40, the length and the "back-bone" of the body, the weight of the mass 50 and the angular velocity imparted to the device 20 all tend to affect the ultimate configuration assumed by the body 40, regardless of the particular form utilized, when the flag 42 is withdrawn into the cavity 26, as well as when it is extended therefrom.

OPERATION

It is believed that in view of the foregoing description, the operation of the device will be readily understood and it will be briefly reviewed at this point.

It is to be understood that the pressure responsive device 20 can be employed in an environment quite different from that hereinbefore described. For example, a single device 20 may be mounted on other than dual wheels and employed for indicating the magnitude of changes in pressure within a single tire for any vehicle.

Furthermore, the utility of the device 20 is not limited to indicating the magnitude of changes in pneumatic pressures experienced within pneumatic tires for vehicles. However, it is to be understood that the device 20 is particularly suited for such use. Accordingly, for purposes of describing the function of the device 20, reference is made to the aforementioned dual wheel 10 having pneumatic tires 12 and 14 mounted on the rims thereof.

As shown in FIG. 1, the dual wheel 10 includes a pair of pressure responsive devices 20, one of which is connected with the inboard tire 12 while the other device 20 is coupled with the outboard tire 14. Where desired, the spherical masses 50 are of different colors for readily identifying the tires with which the body 40 of the device 20 is associated.

It will be appreciated, of course, that the operation of the devices 20 is essentially the same, regardless of whether the body 40 includes a thickened wall portion 56, as shown in FIG. 5, a leaf spring 58, as illustrated in FIG. 6, or a pleated wall portion 60, as shown in FIG. 7. Since the purpose of the body 40, in each instance, is to facilitate an alternate configuring of the body 40 to both arcuate and linear configurations, in response to pressure changes of predetermined magnitudes occurring within the associated tire, the device 20 functions in substantially the same manner regardless of the particular form of the body employed.

The body 40, of each device 20, through a base block 30 and a conduit 52, is in direct communication with a body of fluid or air confined within the tire associated therewith. The pressure of this body of fluid, when of a given magnitude, causes the body 40 to deform and thus position the mass 50 out of the line of vision of an operator for the vehicle. This occurs as the pressure of the fluid within the body 40 causes an appropriate portion of the wall opposite the wall portion of the body 40 adjacent the axle 16 of the wheel to elongate for imparting an arcuate configuration to the body 40. The magnitude at which deformation occurs can empirically be determined, if so desired. Assuming the magnitude of the pressure is sufficiently great, the imparted arcuate configuration is maintained during the operation of the vehicle to which the dual wheel 10 is affixed.

However, in the event pressure within the associated tire is sufficiently depleted, the combined effects of the recovery forces of the elongated portion of the wall of the body 40 and the centrifugal forces acting on the mass 50 of the flag 42 cause the body 40 to approach a linear configuration, whereby the spherical mass 50 is extended beyond the cavity 26 of the wheel 10 into the line of vision of the operator.

Of course, the extent to which the spherical mass 50 is extended beyond the cavity 26 of the wheel 10 can be varied simply by varying the length of the tubular body 40. Preferably, however, the tubular body 40 is caused to assume a linear configuration once the pressure within the associated tire falls beneath the predetermined magnitude.

In order to return the flag 42 to the cavity 26, the pressure within the associated tire is elevated to a predetermined magnitude for again causing the body 40 to assume an arcuate configuration for thereby retracting the flag 42, including the mass 50, to the cavity.

In view of the foregoing, it should readily be apparent that the device of the instant invention provides a practical solution to the complex problem of detecting "low tires" on operating vehicles, particularly those vehicles equipped with dual wheels.

Although the invention has been herein shown and described in what is conceived to be the most practical and preferred embodiment, it is recognized that departures may be made therefrom within the scope of the invention, which is not to be limited to the illustrative details disclosed.

Having described my invention, what I claim as new and desire to secure by Letters Patent is:

1. A device adapted to be mounted on a rotatable wheel having a hub and a concentrically related rim for indicating reduction in pressure for a body of fluid confined within a pneumatic tire mounted on said rim comprising:

an hermetically sealed, tubular member formed of a flexible material adapted to be affixed to the rim of said wheel in communication with said body of fluid, means for causing said member to assume an arcuate configuration for positioning the distal end of the member in juxtaposition with the hub of said wheel when the body of fluid is maintained at a preselected pressure, and means including an enlarged mass affixed to the distal end of said member for deflecting said member to a substantially linear configuration in response to centrifugal forces imposed thereon as said wheel is rotated when said pressure is reduced below said preselected pressure.

2. The device of claim 1 wherein said means for causing said member to assume an arcuate configuration includes an elongated, thickened portion of the wall of the tubular member, eccentrically related to the longitudinal axis of symmetry thereof.

3. The device of claim 1 wherein said means for causing said member to assume an arcuate configuration includes an elongated, pleated portion of the wall of the tubular member, eccentrically related to the longitudinal axis of symmetry thereof.

4. The device of claim 1 wherein said means for causing said member to assume an arcuate configuration includes an elongated leaf spring affixed to an elongated portion of the wall of the tubular member.

5. The device of claim 4 wherein said spring is characterized by a linear configuration when in an unstressed condition.

6. The device of claim 1 wherein said mass comprises a visually detectable flag affixed to the distal end of the tubular member.

7. The device of claim 6 wherein said means for causing said tubular member to assume arcuate and linear configurations includes an elongated leaf spring affixed to an elongated portion of a wall of the tubular member.

* * * * *